United States Patent [19]

Caray

[11] Patent Number: 4,580,672

[45] Date of Patent: Apr. 8, 1986

[54] TORSION DAMPING ASSEMBLY FOR AN AUTOMOTIVE CLUTCH PLATE

[75] Inventor: André Caray, Valence, France

[73] Assignee: Valeo, Paris, France

[21] Appl. No.: 494,981

[22] Filed: May 16, 1983

[30] Foreign Application Priority Data

May 14, 1982 [FR] France ................ 82 08425

[51] Int. Cl.⁴ .............................. F16D 3/14
[52] U.S. Cl. .................. 192/106.2; 464/64; 464/68
[58] Field of Search ............ 192/106.1, 106.2, 70.17; 464/64, 67, 68

[56] References Cited

U.S. PATENT DOCUMENTS

| | | | |
|---|---|---|---|
| 1,889,698 | 11/1932 | Reed | 192/106.2 |
| 2,210,074 | 8/1940 | Friedman | |
| 2,234,443 | 3/1941 | Macbeth | 192/106.1 |
| 2,284,278 | 5/1942 | Goodwin | 192/106.2 |
| 4,139,995 | 2/1979 | Lamarche | 192/106.2 |
| 4,223,776 | 9/1980 | Berlioux | 192/106.2 |

FOREIGN PATENT DOCUMENTS 2183390 12/1973 France .
2218504 9/1974 France .
2411999 7/1979 France .
2514446 4/1983 France .
1482639 8/1977 United Kingdom .

Primary Examiner—Rodney H. Bonck
Assistant Examiner—Alan G. Towner
Attorney, Agent, or Firm—Charles E. Brown; Charles A. Brown

[57] ABSTRACT

This torsional damper is of the type incorporating two coaxial parts mounted to rotate relative to one another within a defined range of relative angular movement, and circumferentially acting means resisting such angular movement, determined by pins disposed around the periphery of the hub disk of the coaxial part, each of said pins being engaged with clearance between two axial shoulders formed for this purpose on the ring presented by the coaxial part around said hub disk. According to the invention the axial shoulders thus associated with said pin are formed by the edges of indentations formed circumferentially in the ring by local deformation thereof.

Application suitable for friction clutches for industrial vehicles.

9 Claims, 7 Drawing Figures

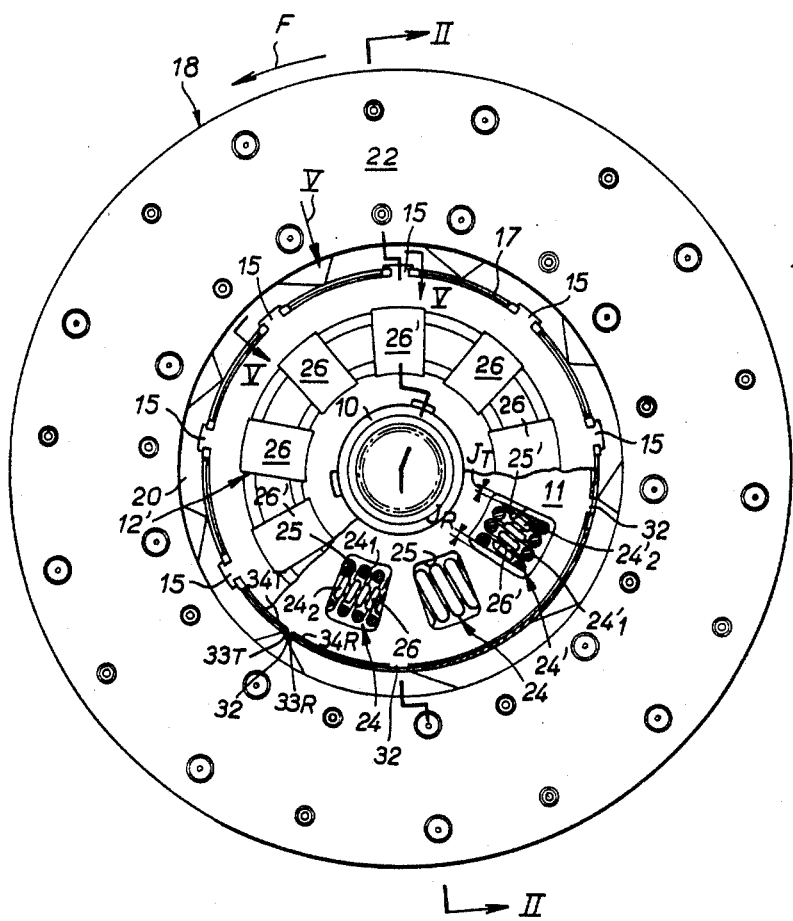
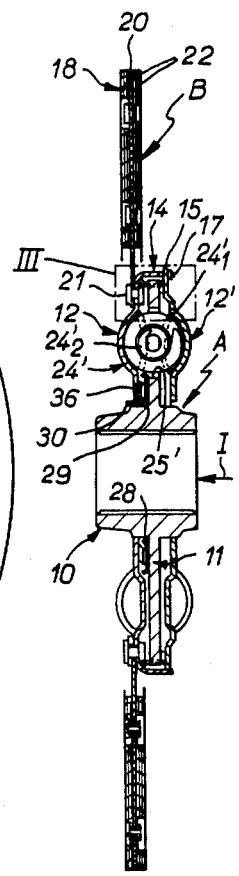
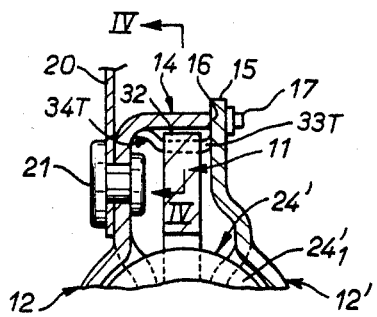

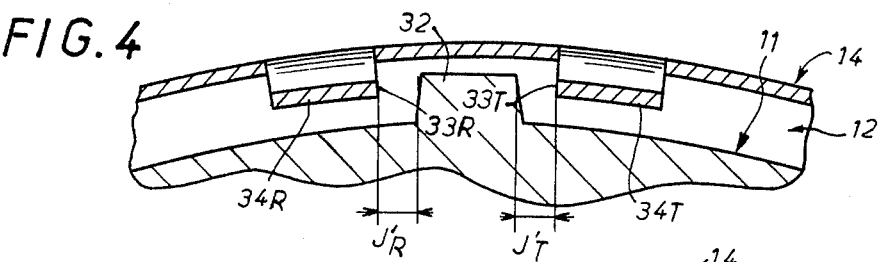
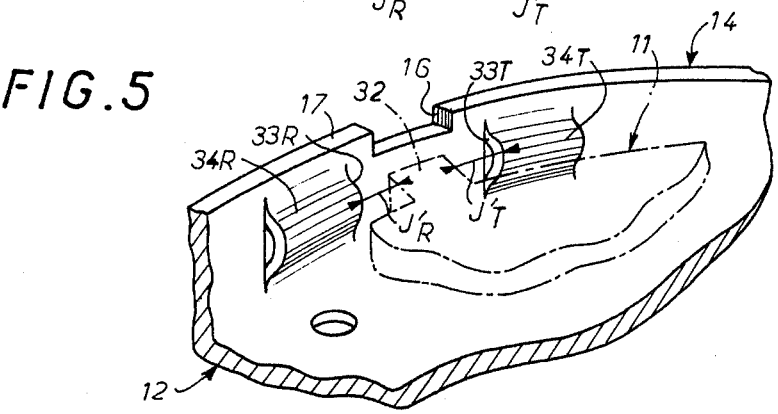
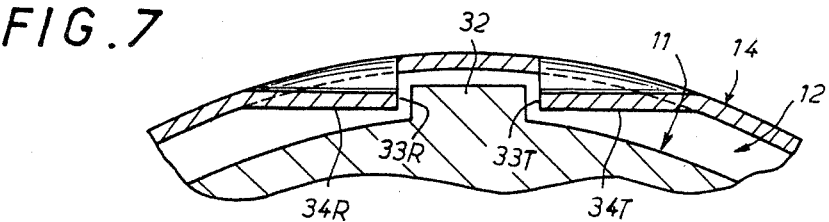
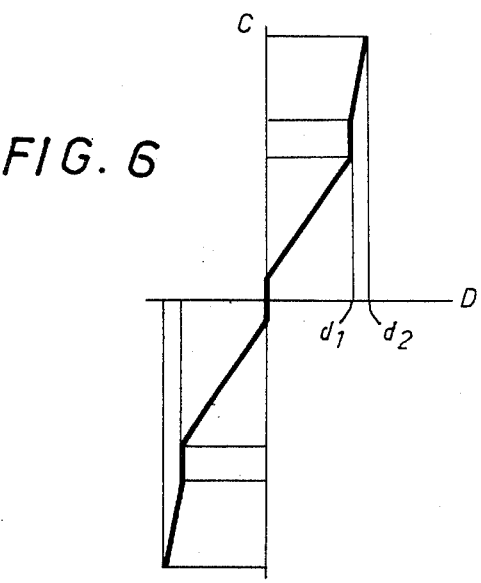

4,580,672

TORSION DAMPING ASSEMBLY FOR AN AUTOMOTIVE CLUTCH PLATE

BACKGROUND OF THE INVENTION

Field of the Invention

The present invention concerns a torsional damper comprising at least two coaxial parts mounted to rotate relative to one another within a defined range of relative angular movement and circumferentially acting elastic means between said parts resisting such relative angular movement.

This type of torsional damper is normally incorporated in the design of a friction clutch, particularly for automotive vehicles, in which case one coaxial part comprises a friction disk designed to rotate with a first shaft, in practice a driving shaft and the motor output shaft in the case of an automotive vehicle, whereas the other of said coaxial parts is carried on a hub designed to rotate with a second shaft, in practice a driven shaft, for example the gearbox input shaft in the case of an automotive vehicle.

This type of torsional damper is used to permit regulated transmission of rotational torque applied to one of its coaxial parts where the other or others are themselves subject to a rotational torque. It is thereby able to filter vibrations which may arise at any point in the kinematic system in which it is incorporated, extending from the motor to the driven road wheels in the case of an automotive vehicle.

The present invention more particularly concerns the case in which one of the coaxial parts incorporates a hub disk whilst a second of said coaxial parts incorporates two annular guides, axially disposed one on each side of said hub disk, the annular guides being axially linked to one another by a ring which extends in the radial direction beyond the periphery of the hub disk.

French patent No. 72 16111 filed May 5, 1972 and published under No. 2 183 390 and French patent application filed Oct. 14, 1981 under No. 81 19298 disclosed such an arrangement. French patent application No. 81 19298 has been published under No. 2,514,446 on Apr. 15, 1983. Further, commonly assigned U.S. application Ser. No. 428,602, filed Sept. 30, 1982, claims priority from French patent application No. 81 19298.

The circumferentially acting elastic means between two coaxial parts of a torsional damper normally comprise helical springs disposed substantially tangentially relative to a circumference of the damper assembly. The ultimate possible range of relative angular movement between these two coaxial parts is therefore determined by the turns of at least certain of these springs approaching continuity.

This inevitably results in a certain limitation of the maximum torque which can be transmitted from one coaxial part to the other.

This torque passes through the springs with their turns approaching contiguity, and in this case these springs in which crushing stresses are combined with the elastic torsional stresses, are generally at the maximum of their mechanical capability.

To avoid such a limitation, and notably, since it is desirable for friction clutches to equip heavy industrial vehicles, to enable additional torque to pass from one coaxial part constituting such a friction clutch to the other after absorption of the maximum possible relative angular movement, it has been proposed to equip the hub disk at its periphery with radially projecting pins each individually engaged, with clearance, between two axial shoulders formed for this purpose in the ring axially linking together the two associated annular guides.

Such an arrangement, whereby the ultimate possible relative angular movement between the two coaxial parts is determined by the provision of a positive circumferential abutment engagement of the pins against the corresponding axially disposed shoulders of the associated ring, is disclosed in the abovementioned French patent No. 72 16111 and French patent application No. 81 19298.

In practice, the axial shoulders thus presented by the ring are formed by the edge of an indentation formed for this purpose in the ring.

This results in a weakening of this ring, as well as a certain complication in assembling the torsional damper, since this assembly procedure may involve an initially non-parallel presentation of the hub disk with respect to the ring, before said hub disk is straightened.

To overcome this problem, it has already been proposed in French patent application filed Oct. 14, 1981 under No. 81 19298, to offset radially the free edge of the ring, at the expense of increasing the complexity of the ring.

The object of the present invention is to provide an arrangement to obtain the required axially disposed shoulders on such a ring in a simple manner, the invention also offering further advantages.

More precisely, the object of the present invention is a torsional damper suitable for use in a friction clutch, particularly for automotive vehicles, comprising at least two coaxial parts, mounted to rotate relative to one another within a defined range of relative angular movement, and elastic means comprising one coaxial part incorporating a hub disk and a second coaxial part incorporating two annular guides, axially disposed one on each side of the hub disk, the annular guides being axially linked to one another by a ring which extends in the radial direction beyond the periphery of the hub disk, the hub disk being equipped at its periphery with radially projecting pins each individually engaged, with clearance, between two axial shoulders of the ring, at least one of the axial shoulders thus presented by the ring for each of the pins of the hub disk being formed by the edge of an indentation formed in the circumference of the ring by simple local deformation of the ring.

Through such an arrangement, the mechanical weakening to which the ring is subjected through the formation of the required axial shoulders is rendered minimal, since none of the material of the ring is lost.

In addition, since the axial shoulders thus formed by indentations in the ring are themselves radially offset with respect to the continuous part of the ring, it is no longer necessary for the free edge of the ring to be offset in the radial direction, to obtain an axial engagement of the hub disk in the ring. In addition, for the same total radial dimension, the hub disk may if required present a higher diameter between the axial shoulders of the ring, without altering the ease with which it engages axially in the ring.

Since according to the invention the formation of indentations in the ring inevitably involves work hardening of the material constituting the ring, this ring advantageously presents increased mechanical strength through each of the axial shoulders which it presents to provide a circumferential abutment for the pins of the associated hub disk.

If for attachment to the ring, one of the annular guides has at intervals around its periphery radially projecting lugs which can be engaged in openings made for this purpose on the corresponding edge of the ring to secure the assembly, the axial shoulders of the ring may advantageously be circumferentially disposed on each side of these openings.

U.S. Pat. No. 2,210,074 discloses a torsional damper in which the axial shoulders presented by the ring for cooperation with the hub disk are formed by means of indentations therein.

However, unlike the arrangement disclosed by the present invention, the hub disk in U.S. Pat. No. 2,210,074 does not incorporate projecting pins for engagement between two indentations in the ring, but hollow openings in each of which it is engaged on a single such indentation.

This results in both a weakening of the mechanical strength of the hub disk, which is not circularly continuous at its periphery, since it incorporates openings, as well as a weakening of the mechanical strength of the ring since the deformation of the parts of the ring involved must be sufficient to be able to penetrate into the openings in the hub disk.

In practice, according to U.S. Pat. No. 2,210,074, the deformations in the ring corresponding to these indentations, in order to be radially sufficiently deep, affect the entire width of the ring.

In other words, the material of the ring is not axially continuous through these deformations, by virtue of the complete absence of material here.

This is not the case in the torsional damper according to the invention in which the local deformations in the ring forming the indentations in the ring advantageously affect only part of the width of the ring.

In U.S. Pat. No. 2,210,074 and as mentioned above, the deformations in the ring cooperate with the openings in the hub disk, these openings corresponding to the housing of springs disposed between the two coaxial parts constituting the torsional damper, which means that the position of these deformations on the rings is necessarily related to that of the openings on the hub disk.

This is not the case in the torsional damper according to the invention, in which the hub disk is advantageously protected, the ring being able to act thereupon if required at a point circumferentially separated from the spring housings, and therefor at a point of the hub disk where it is not radially weakened by said housings.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 1 is a partial view in elevation of a torsional damper device in accordance with the invention, in the direction of the arrow 1 in FIG. 2;

FIG. 2 is a view in axial cross section on the line II—II in FIG. 1.

FIG. 3 is a larger scale detail of the inset III in FIG. 2;

FIG. 4 is a partial cross section of the torsional damper in accordance with the invention, to the same scale as FIG. 3, along line IV—IV in FIG. 3;

FIG. 5 is a partial perspective view of the hub disk forming part of the torsional damper and the ring associated therewith;

FIG. 6 is a diagram showing the operation of the torsional damper according to the invention;

FIG. 7 is a view analagous to that in FIG. 4 concerning an alternative embodiment.

These figures illustrate an example of an application of the invention to a friction clutch for automotive vehicles.

In the embodiment shown, this friction clutch incorporates two coaxial parts A,B, mounted to rotate relative to one another, within a defined range of relative angular movement and elastic means resisting such relative angular movement.

In the embodiment shown, coaxial part A incorporates a hub 10 and a transverse annular hub disk 11, forming an integral part of said hub 10.

For example, and as shown, hub disk 11 may be continuous with disk 10, in the median zone thereof.

Also in the embodiment shown, coaxial part B incorporates two transverse annular guides 12, 12', axially disposed one on each side of hub disk 11, separated therefrom.

These annular guides, 12, 12' are axially linked to one another by a ring 14 which extends in the radial direction beyond the periphery of hub disk 11.

In the embodiment shown, this ring 14 is continuous with annular guide 12, the whole being cut and stamped for example from the same blank, and annular guide 12' presents radially disposed lugs 15 at intervals along its periphery, through which it is engaged and crimped in openings 16 provided for this purpose on ring 14, along free edge 17 thereof, according for example to arrangements of the type described in French patent application filed on Dec. 13, 1977 under No. 77 37511 and published under No. 2 411 999.

For example, and as shown, nine lugs 15, regularly spaced in a circle, may thus be provided on the periphery of annular guide 12' of ring 14 incorporating an equal number of openings 16.

In the case of a friction clutch for automated vehicles, coaxial part B thus constituted incorporates a friction disk 18.

This friction disk is formed from a disk 20, which in practice is circumferentially divided into vanes, and which on its internal periphery, is attached by rivets 21 to annular guide 12, on its surface opposite that of annular guide 12', while, on its external periphery, it is equipped laterally on each side with friction pads 22.

The elastic means resisting the relative angular movement between coaxial parts A,B thus constituted are mounted circumferentially between coaxial parts A,B and are formed in the embodiment shown of helical springs 24, 24', disposed substantially tangentially relative to a circumference of the damper assembly.

In the embodiment shown, there are six such springs 24 which alternate in pairs with springs 24', of which there are three, the assembly being disposed at regular intervals in a circle.

Some of springs 24 are disposed in apertures 25 of hub disk 11, the others being disposed in housings 26 made for this purpose in annular guides 12, 12', said housing 26 in the embodiment shown being stamped alternately in opposite axial directions in said annular guides 12, 12', and corresponding thereto.

In practice, in the embodiment shown, springs 24 are engaged without circumferential clearance in apertures 25 of hub disk 11 and housings 26 of annular guides 12, 12'.

According to an arrangement similar to the foregoing, some of springs 24' are disposed in slots 25' of hub disk 11 the rest being disposed in housings 26' of annular guides 12, 12'.

However, although the springs 24' are engaged without circumferential clearance in housings 26' of annular guides 12, 12', a circumferential clearance is provided, for the idle configuration of the damper assembly, between their circumferential ends and the corresponding circumferential ends of apertures 25' of hub disk 11.

For the circumferential direction corresponding to the direction of increasing torque, which is also the normal direction of rotation of said assembly, as shown by the arrow F in FIG. 1, this circumferential clearance has the value JT.

For the opposite circumferential direction, corresponding to the direction of decreasing torque, it has the value JR. In the embodiment shown, circumferential clearances JT and JR have the same value, but this is not necessarily the case in other embodiments.

In addition, in the embodiment shown, springs 24, 24' are duplicated, each of these springs being in practice formed from two coaxial springs of the same length but of different diameters, respectively $24_1$, $24_2$, and $24'_1$, and $24'_2$, disposed one inside the other.

In the embodiment shown, the friction clutch is completed by friction means acting axially between the two coaxial parts A, B which constitute the clutch.

In this embodiment, friction ring 28 is applied to hub disk 11 on the side for example of annular guide 12, carried by support ring 29 secured against rotation by axial lugs 30 on this annular guide 12.

An axially acting elastic ring 36 of the type for example sold under the trade name ONDUFLEX, is interposed axially between support ring 29 and annular guide 12, to maintain friction ring 28 in permanent contact with hub disk 11.

These arrangements are well known per se, and as they do not constitute part of the present invention, will not be described in further detail here.

Also in a manner known per se, to delimit the possible relative angular movement between coaxial parts A, B, hub disk 11 is equipped at its periphery with radially projecting pins 32 each individually engaged between two axial shoulders 33T, 33R formed for this purpose in ring 14, with, for the idle configuration of the damper assembly, a circumferential clearance J'T in one direction corresponding to increasing torque of the damper assembly, and J'R in the opposite direction corresponding to decreasing torque of said damper assembly.

In the embodiment shown, circumferential clearances J'T, J'R are identical, but as shown, this is not necessarily the case.

In all embodiments, these clearances J'T, J'R are respectively greater than previously mentioned clearances JT, JR.

In the embodiments shown, pins 32 are circumferentially offset with respect to apertures 25, 25'.

According to the invention, at least one of axial shoulders 33T, 33R in ring 14 is transversely in the shape of a channel, this indentation having a uniform cross section along its circumferential extension, through this fact being open at each of its circumferential ends.

In the preferred embodiment shown, each of indentations 34T, 34R in ring 14 is offset circumferentially with respect to openings 16 in said ring, and, in practice, the two indentations 34T, 34R in ring 14 for each of pins 32 of hub disk 11 extend respectively on each side of an opening 16 therein.

However, in the embodiment shown, there is only a reduced number of pins 32 as compared with 16, this number being for example six, as shown.

As will be noted, indentations 34T, 34R in ring 14 are very easily formed by simple local deformation thereof, the circumferential ends of said indentations being sheared without removal of material.

The integrity of ring 14 is thus advantageously practically retained.

This advantage is enhanced in practice as the local deformation of ring 14 required to form an indentation 34T, 34R therein advantageously affects only part of the axial width of said ring.

It will be appreciated that the action of the punching tool used operates in the radial direction, from the exterior towards the center.

As will also be noted, in its continuous section, ring 14 retains a simple configuration which in cross section is almost rectilinear, without any radial displacement of its free edge 17.

As will finally be noted, the indentations according to the invention which form axial shoulders 33T, 33R advantageously enable the torsional damper to be assembled with hub disk 11 in line with ring 14, facilitating said assembly operation and, hub disk 11 once positioned in ring 14 is peripherally enveloped in its entirety by said ring, including in the plane perpendicular to its pins 32, providing excellent protection thereof.

In service, coaxial part B constitutes in practice a driving part, its friction disk 18 being intended to be clamped in the axial direction by its friction pads 22 between two plates constrained to rotate with a driving shaft, in this case the output shaft of the motor of an automotive vehicle, and, coaxial part A constitutes a driven part, its hub 10 being intended to be linked in rotation to a driven shaft generally by a channel arrangement, for example the input shaft to a gearbox in the case of an automotive vehicle.

If torque is then applied to coaxial part B in a direction of arrow F in FIG. 1, this coaxial part B drives coaxial part A.

However, initially, the only parts acting are springs 24.

After absorbing the preliminary assembly stress normally presented by said springs in their housings, these springs 24 yield elastically, so that a relative angular movement develops between coaxial part B and coaxial part A in the direction of rotation of the damper assembly, as shown in the diagram in FIG. 6, on which the relative angular movement D is shown as the abscissa and the corresponding transmitted torque C as the ordinate.

For a value D1 of angular movement D, corresponding to an absorption of circumferential clearance JT, springs 24' in turn take effect, as before, after absorption of their preliminary stress, and add their effect to that of springs 24, which remain in compression. Finally, for a value D2 of relative angular movement D corresponding to an absorption of circumferential clearance J'T, pins 32 of hub disk 11 come into contact with the corresponding axial shoulders 33T of ring 14, through the effect of the circumferential abutment between them.

There is then positive drive to coaxial part A through coaxial part B without intervention of springs 24, 24' which nevertheless remain in compression.

Because of this, an additional torque may then be transmitted from coaxial part B to coaxial part A.

In the direction of decreasing torque, the process is reversed.

Such a procedure is known per se, and will not therefore be described in further detail here.

As will be appreciated, to simplify the diagram in FIG. 6, the hysteresis effects due to friction ring 28 have not been taken into account.

As is known, for the same value of relative angular movement D these hysteresis effects lead to a difference in the value of the torque transmitted for the increasing direction of torque compared to its value for the decreasing direction of torque.

In the embodiment shown in FIG. 7, each of indentations 34T, 34R in ring 14 for each of pins 32 of hub disk 11 is in the shape of a quarter ellipsoid obtained by sectioning on two mutually or thorgonal planes of symmetry, open at only one of its circumferential ends, where it forms the corresponding axial shoulder 33T, 33R, while being closed at the other end.

These indentations 33T, 33R therefore decrease in cross section from their open circumferential end to their closed circumferential end.

The punching tool used is advantageously simplified, a single shearing stroke being required for each indentation.

In addition, in this embodiment, the median circumferential lines of each of the two indentations 33T, 33R in ring 14 for each of pins 32 of hub disk 11, shown by the sectional lines in FIG. 7, are each rectilinear and substantially in line with each other, as shown on FIG. 7.

In all cases, there is advantageously axial continuity of material for the ring through each of the indentations, except for the circumferential ends thereof.

As will be appreciated, the present invention is not limited to the embodiments described and shown, but encompasses all variants of execution and/or combination of the various elements thereof.

In addition, the field of application of the invention is not limited only to those torsional dampers incorporating only two coaxial parts mounted to rotate relative to one another, but also extends to the case in which move coaxial parts, mounted to rotate in pairs, are provided within such a torsional damper.

It is claimed:

1. A torsional damper for an automotive clutch plate, said torsion damper comprising at least two coaxial parts mounted to rotate relative to each other within a defined range of relative angular movement against elastic means operatively disposed between said coaxial parts, a first of said coaxial parts incorporating two annular guides axially disposed one on each side of said hub disk, said hub disk having radial projections at its periphery, a ring disposed radially beyond the periphery of said hub disk and axially connecting said annular guides together, said ring having two axial shoulders for each of said projections, said projections being received with circumferential clearance between said axial shoulders, at least one of said shoulders for each of said projections being defined by an edge of a radially inward indentation in said ring severed and radially offset from an immediately circumferentially adjacent portion of said ring.

2. A torsional damper according to claim 1, wherein each end of each of said radial indentations is severed and radially offset from the corresponding immediately circumferentially adjacent portions of said ring, to define the respective axial shoulders for said projections.

3. A torsional damper according to claim 1, wherein each of said indentations in said ring is a circumferentially extending channel, open at both of its circumferential ends.

4. A torsional damper according to claim 1, wherein each of said indentations is of quarter-ellipsoid configuration open at one circumferential end for defining said one axial shoulder.

5. A torsional damper according to claim 2, wherein median circumferential lines of two of said indentations for one of said projections are rectilinear and substantially aligned with each other.

6. A torsional damper according to claim 1, wherein openings are provided at an end of said ring for connecting one of said annular guides thereto, said indentations being circumferentially offset with respect to adjacent ones of said openings.

7. A torsional damper according to claim 2, wherein openings are provided at an end of said ring for connecting said annular guides thereto, said indentations circumferentially alternating with said openings.

8. A torsional damper according to claim 1, wherein said ring is axially continuous through each of said indentations except for a zone of severence at said one axial shoulder.

9. A torsional damper according to claim 1, wherein said indentation covers only part of the axial dimension of said ring.

* * * * *